United States Patent [19]

Beardsley et al.

[11] Patent Number: 5,361,344
[45] Date of Patent: Nov. 1, 1994

[54] METHOD OF OPERATING, VIA A BLOCK MODE TERMINAL, UNIX PROGRAMS FOR A CHARACTER MODE TERMINAL

[75] Inventors: Gregg B. Beardsley, Sandy; Fredrick M. Wilhelmsen, Salt Lake City, both of Utah

[73] Assignee: Unisys Corporation, Blue Bell, Pa.

[21] Appl. No.: 10,911

[22] Filed: Jan. 29, 1993

[51] Int. Cl.$^5$ .............................................. G06F 3/00
[52] U.S. Cl. .................................... 395/500; 395/155
[58] Field of Search ...................... 395/500, 155, 144

[56] References Cited

U.S. PATENT DOCUMENTS

| | | | |
|---|---|---|---|
| 4,463,442 | 7/1984 | Dachowski et al. | 395/144 |
| 4,574,362 | 3/1986 | Spindel et al. | 395/325 |
| 4,733,351 | 3/1988 | Peirent | 395/144 |
| 5,036,484 | 7/1991 | McCoy et al. | 395/500 |
| 5,173,854 | 12/1992 | Kaufman et al. | 364/419 |
| 5,197,124 | 3/1993 | Busboom et al. | 395/155 |

FOREIGN PATENT DOCUMENTS

| | | |
|---|---|---|
| 0371377 | 6/1990 | European Pat. Off. |
| 63-268035 | 2/1989 | Japan . |
| 1-251256 | 12/1989 | Japan . |
| 2-002448 | 3/1990 | Japan . |
| 2-206817 | 8/1990 | Japan . |

Primary Examiner—Parshotam S. Lall
Assistant Examiner—Viet Vu
Attorney, Agent, or Firm—Charles J. Fassbender; Mark T. Starr; Stanton D. Weinstein

[57] ABSTRACT

An emulator enables a UNIX program to operate with a block mode terminal, even though the UNIX program is designed to operate with a character mode terminal. Initially, the emulator receives from the UNIX program, a UNIX output sequence of characters which produces a display on a video screen in the character mode terminal. Then the emulator converts the UNIX output sequence of characters into an input sequence of characters for the block mode terminal which there produces an emulated display and which protects the emulated display from operator alteration except for certain fields. Thereafter, the block mode terminal transmits a response character sequence which includes data characters written by an operator into the unprotected fields and no characters from the protected portions of the display. Then the emulator generates a UNIX input character sequence from the terminal response character sequence in which the data characters are repeated and in which, for any empty field, a control character is included that identifies a key in the character mode terminal by which the field is skipped.

16 Claims, 3 Drawing Sheets

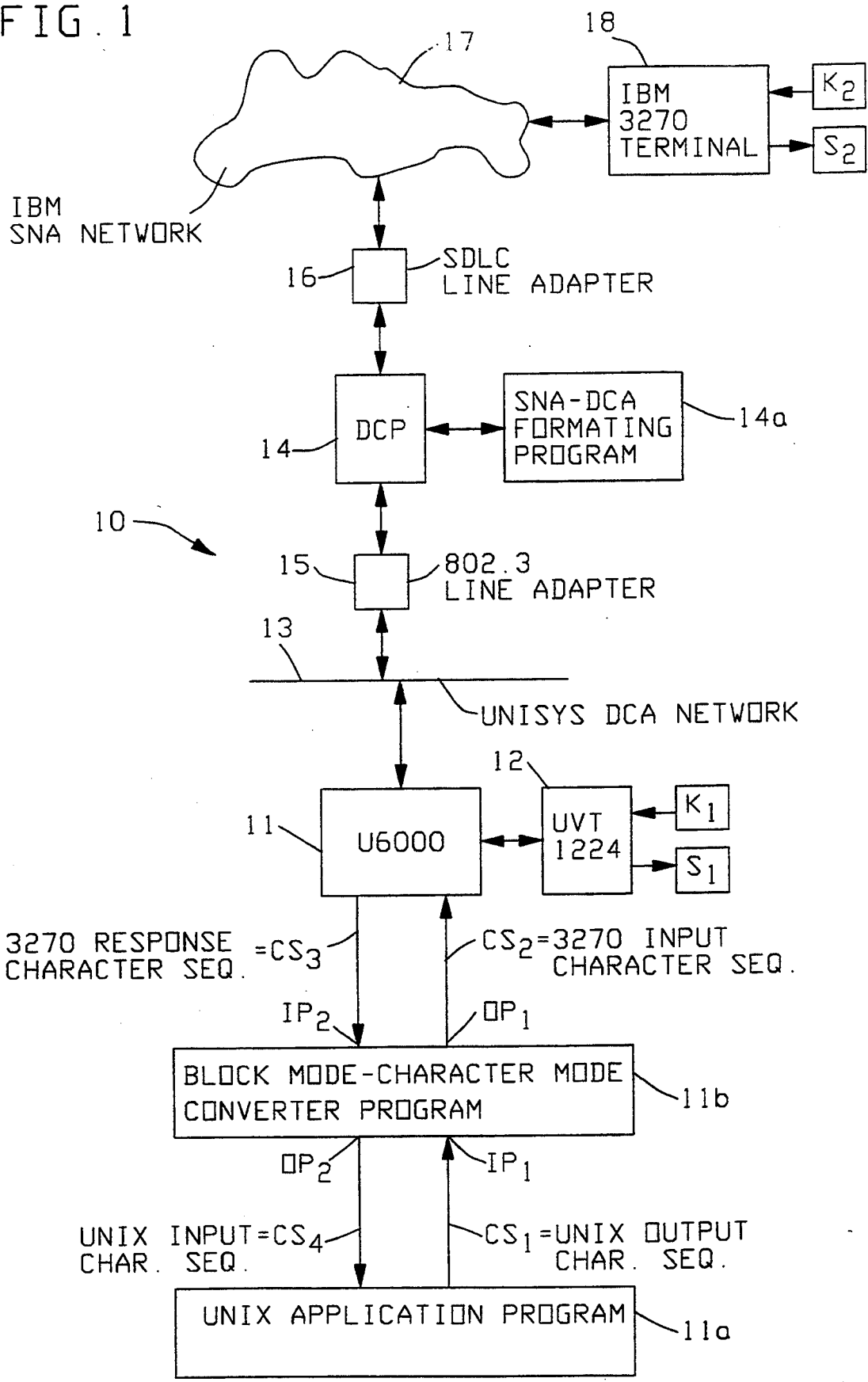

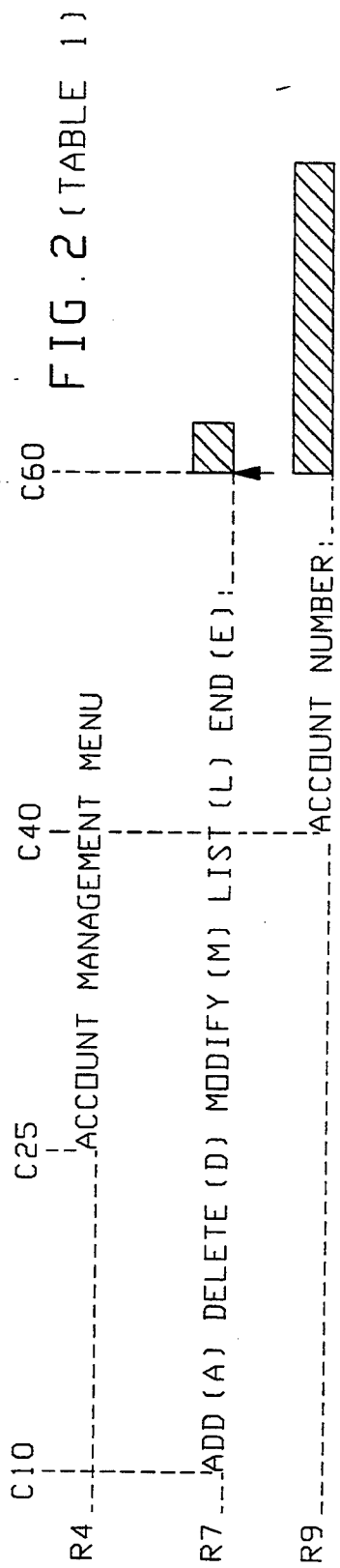
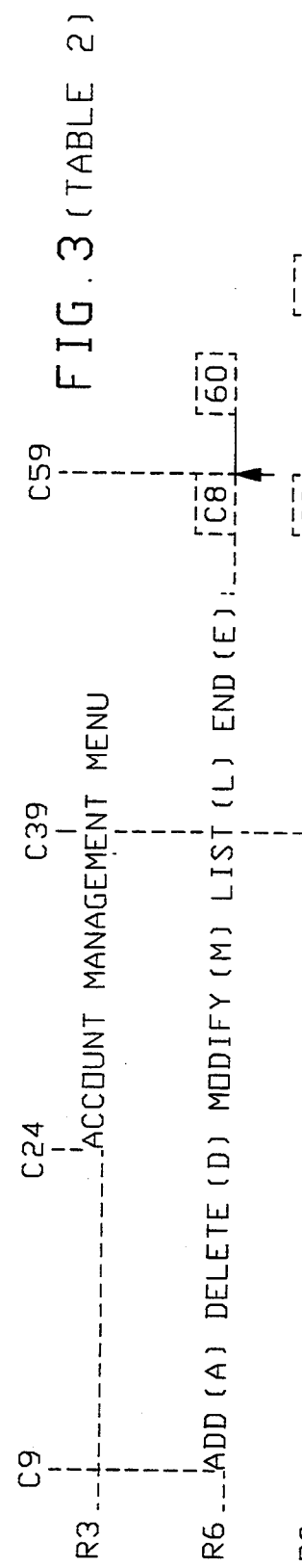
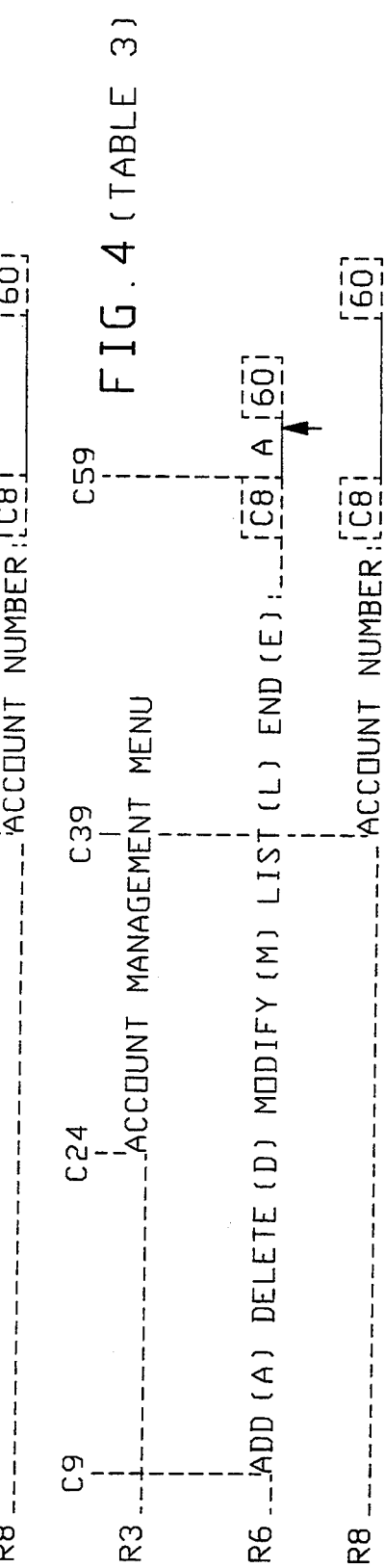

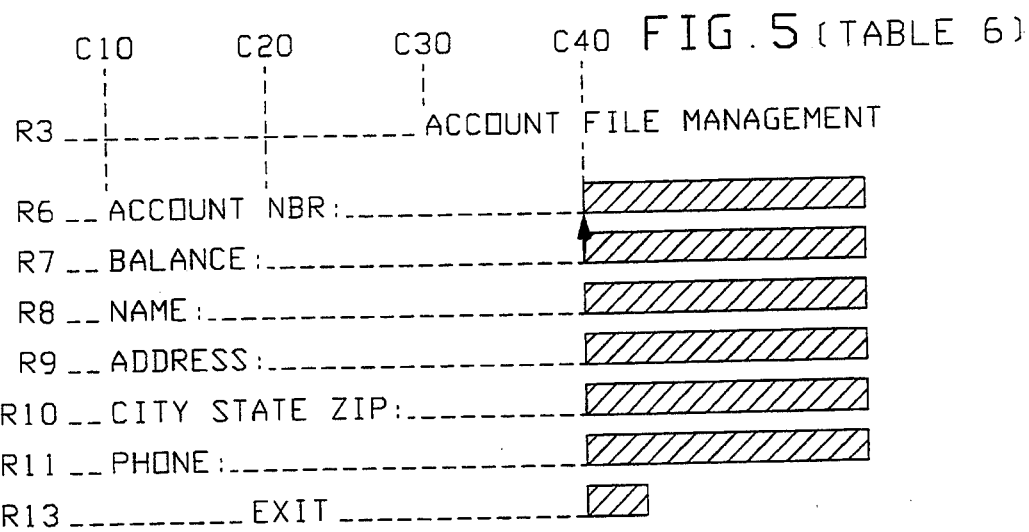
FIG. 5 (TABLE 6)
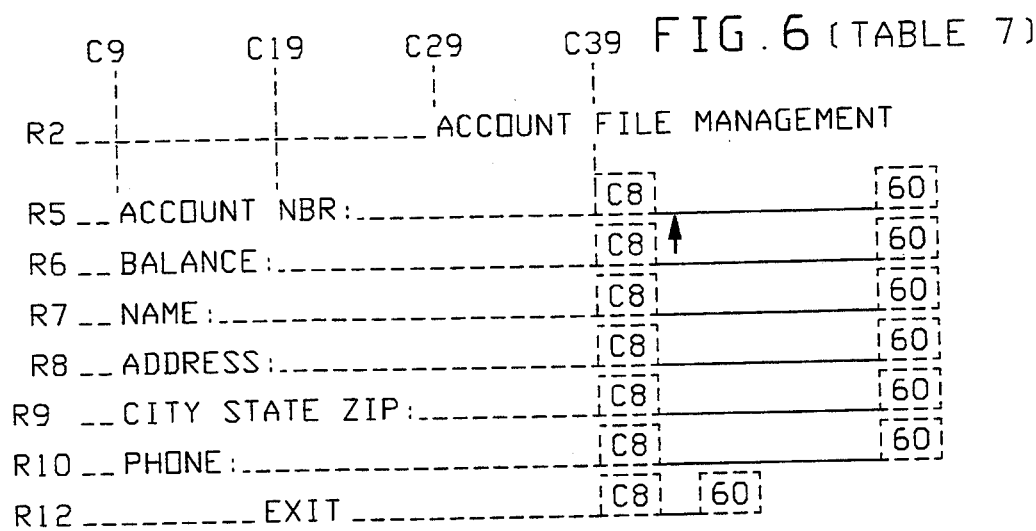
FIG. 6 (TABLE 7)
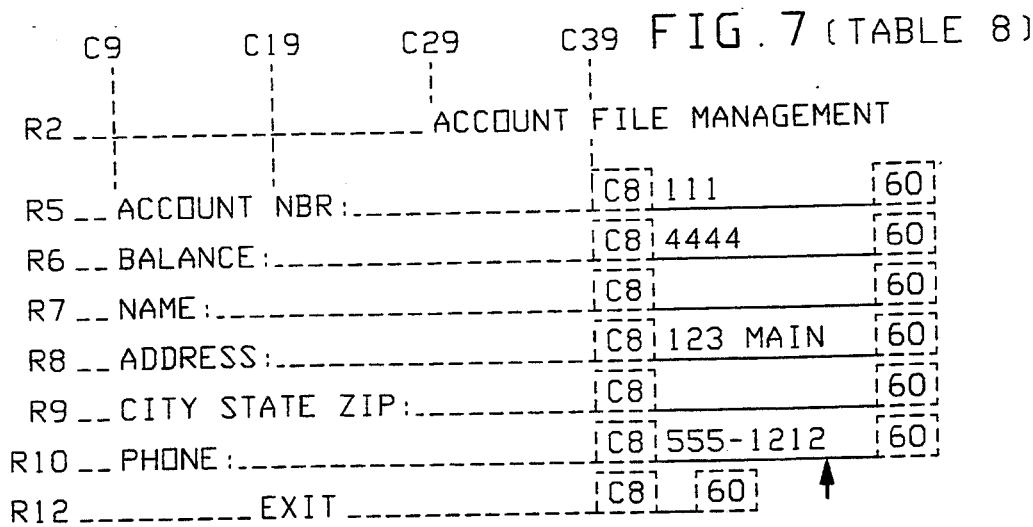
FIG. 7 (TABLE 8)

METHOD OF OPERATING, VIA A BLOCK MODE TERMINAL, UNIX PROGRAMS FOR A CHARACTER MODE TERMINAL

BACKGROUND OF THE INVENTION

This invention relates to emulation in data processing systems; and more particularly, it relates to a novel block mode-character mode converter program which enables UNIX application programs, that operate interactively with character mode input/output terminals, to be run efficiently and without modification from incompatible block mode input/output terminal.

In the prior art, thousands of UNIX application programs exist which are designed to operate in an highly interactive fashion with an operator of a character mode input/output terminal. Some examples of these interactive UNIX application programs are accounting programs for businesses, scientific programs for engineers, etc.; and, some examples of the character mode terminals are a VT100, VT220, and a UVT1224.

Each such character mode terminal includes a keyboard and a visual display screen; and, when any one key on the keyboard is pushed by an operator, a character signal representing the pushed key is sent immediately to the UNIX application program. Then, the UNIX application program immediately examines the character which it receives. Based on what the received character is, the UNIX application program either simply resends that character back to the character mode terminal for display on its screen, or the UNIX application program performs some internal operation and indicates the result by sending other characters to the character mode terminal for display on its screen. Thus, the UNIX application program operates in a highly interactive fashion with the character mode terminal since, as each key is pushed the program senses the key and takes some action.

By comparison, the prior art also includes block mode input/output terminals. These terminals, like the character mode terminals, also have a keyboard and a visual display; however, the block mode terminals operate in a totally different fashion than the character mode terminals. Some examples of block mode terminals are an IBM 3270, UNISCOPE, and POLL SELECT.

Typically, several block mode terminals are interconnected to a computer on a time-shared data communications network, such as the IBM SNA network. In operation, each terminal sends a message on the network only when an operator presses a certain TRANSMIT key, or its equivalent, on the terminal's keyboard. Before pushing the TRANSMIT key, the operator of the block mode terminal usually presses many data character keys and cursor control keys on the keyboard, and the terminal itself will display and edit the data characters without sending any message on the network. Then, when the transmit key is pressed, the entire display is sent as a block of characters on the network.

Suppose now that the operator of the block mode terminal desires to run one of the prior art UNIX application programs. That program cannot simply be loaded into the computer on the network and run from the block mode terminal since the UNIX application program is written to interact with each key as it is pushed on a character mode terminal. Also, the UNIX application program cannot be easily modified to run directly with the character mode terminal since the entire program is built around sensing and responding to every keystroke by the operator. Further, various control keys on the block mode terminal (e.g.—TRANSMIT) don't even exist on the character mode terminal; and vice-versa.

Also, another critical factor which needs to be addressed in solving the above problem is the amount of data transmission that is generated on the network when the UNIX program interacts with the character mode terminal. If, for example, an entire screen of characters were somehow sent over the network to the UNIX program each time a data character key was pushed, the network data transmissions would be too inefficient to be practical.

Accordingly, a primary object of the invention is to provide a novel block mode-character mode converter program, whereby UNIX application programs for character mode terminals can be run efficiently and without modification by a block mode terminal on a network.

BRIEF SUMMARY OF THE INVENTION

With the present invention, a block mode terminal interacts over a network with a UNIX application program through a block mode-character mode converter program which operates as follows. First, the converter program receives from the UNIX program, a UNIX output sequence of characters which, in the character mode terminal, will produce a visual display. Then, the converter program examines the UNIX output sequence of characters for first type control characters that define a predetermined visual attribute, such as highlighting, at various regions within the display. In response, the converter program sends an input sequence of characters over the network to the block mode terminal which produces an emulated display on a video screen in the block mode terminal that mimics the display in the character mode terminal. And included in that input sequence of characters for the block mode terminal, are second type control characters which protect all of the emulated display from operator alteration except for certain fields that correspond to the regions in the character mode terminal display with the predetermined visual attribute.

Thereafter, the converter program receives over the network, from the block mode terminal, a response character sequence which includes all characters written by an operator into the unprotected fields of the emulated display. However, since all other portions of the emulated display are protected from operator input, no characters from those protected screen portions are sent by the character mode terminal. Thus, if the unprotected fields of the emulated display occupy only 10% of the entire emulated display; transmission time on the network is reduced by a factor of 10:1 in comparison to the transmission time for one full screen.

Next, the converter program examines the response character sequence to see if any data entry fields, as defined by the previously sent second type control characters are empty. Then the converter program generates a UNIX input character sequence from the block mode terminal response character sequence in which data characters in data entry fields are repeated; and for each empty field, a third type control character is included that identifies a key in the character mode terminal by which an operator can skip a field.

BRIEF DESCRIPTION OF THE DRAWINGS

Various features and advantages of the invention are described herein in conjunction with the accompanying drawings, wherein:

FIG. 1 illustrates a data processing system which operates as one preferred embodiment of the present invention;

FIG. 2 shows a visual display which a character sequence $CS_1$ in the FIG. 1 system will generate in a character mode terminal;

FIG. 3 shows a visual display which emulates the FIG. 2 display and which occurs in a block mode terminal in the FIG. 1 system in response to a character sequence $CS_2$;

FIG. 4 shows a modification to the FIG. 3 display wherein an operator of the block mode terminal of the FIG. 1 system has entered data and which produces a character sequence $CS_3$;

FIG. 5 is another visual display which occurs in the character mode terminal of FIG. 1 in response to the character sequence $CS_1$;

FIG. 6 is another visual display that occurs in the block mode terminal of FIG. 1 which emulates the FIG. 5 display and which occurs in response to the character sequence $CS_2$; and, FIG. 7 is a modification to the FIG. 6 display in which data has been entered by an operator of the block mode terminal and which produces the character sequence $CS_3$.

DETAILED DESCRIPTION

Referring now to FIG. 1, it shows a data processing system 10 which is a preferred embodiment of the present invention. This data processing system 10 includes the following units: a Unisys U6000 digital computer 11, a UVT 1224 input/output terminal 12, a Unisys DCA data communications network 13, a Unisys data communications processor 14, an 802.3 line adaptor 15, a SDLC line adaptor 16, an IBM SNA data communications network 17, and an IBM 3270 input/output terminal 18. All of these units 11–18 are interconnected to each other as illustrated.

In the above data processing system 10, the U6000 computer 11 sends messages through the units 13-17 to the input/output terminal 18; and, terminal 18 sends messages through the units 17-13 to the U6000 computer 11. These messages have different formats on the two data communications networks 13 and 17; and to convert from one format to the other, the data communications processor 14 executes an SNA-DCA formatting program 14a which is stored in that processor's memory.

Also, in the memory of the U6000 computer 11, two other programs 11a and 11b are stored. Program 11a is a UNIX applications program which is designed to operate in an interactive fashion with an operator via the keyboard K1 and video screen S1 of the UVT 1224 input/output terminal 12. That terminal 12 is a character mode terminal wherein each key on the keyboard K1 which is pressed by an operator is sent immediately to the UNIX program 11a.

By comparison, the IBM 3270 terminal 18 is a block mode terminal which is operated in a totally different fashion than the character mode terminal 12. Thus, the terminal 18 cannot operate directly with the UNIX applications program 11a. However, program 11b is a block mode-character mode converter program which, in accordance with the present invention, enables the block mode terminal 18 to emulate the character mode terminal 12 and thereby operate with the UNIX application program 11a.

To perform the above emulation, the program 11b has two input ports $IP_1$ and $IP_2$, and it has two output ports $OP_1$ and $OP_2$. On the input port $IP_1$, a first character sequence CS 1 is received which is generated by the UNIX applications program 11a. character sequence $CS_1$ is of a type which will produce a visual display on the screen $S_1$ in the character mode terminal 12.

In response to the character sequence $CS_1$, program 11b generates a completely different second character sequence $CS_2$ on its output port $OP_1$; and that character sequence $CS_2$ is sent over the units 13-17 as an input to the IBM 3270 terminal 18. There, the second character sequence $CS_2$ produces a visual display on the screen $S_2$ which mimics the visual display on the screen $S_1$.

Thereafter, in response to the visual display on the screen $S_2$, an IBM 3270 operator types in certain data via the keyboard $K_2$. When the step is complete, the 3270 terminal sends a third character sequence $CS_3$ form the terminal 18 thorough the units 17-13 to input port $IP_2$ of the converter program 11b.

Program 11b then converts the third character sequence $CS_3$ to a totally different fourth character sequence $CS_4$ on its output port $OP_2$ which emulates a response character sequence from the character mode terminal 12. That fourth character sequence $CS_4$ is then sent from the output port $OP_2$ as an input to the UNIX applications program 11a.

This process of generating the character sequences $CS_1$–$CS_4$ is repeated over and over until the operator of the terminal 18 completes his use of the UNIX applications program 11a; and thus, the character sequences $CS_2$ and $CS_3$ are transmitted over two data communication networks 13 and 17 multiple times. Consequently, it is very important to reduce the length of the sequences $CS_2$ and $CS_3$ because as their length is reduced, a) the response time between the operator of terminal 18 and the UNIX application program 11a is reduced; and b) the cost of using the IBM SNA network, which is time shared with other terminal (not shown), 17 is reduced. How the length of sequences $CS_2$ and $CS_3$ is reduced, as well as other novel aspects of the invention, will now be described in conjunction with the following tables 1–10.

TABLE 1

| (UNIX OUTPUT) | |
|---|---|
| CHAR. SEQ. $CS_1$ | MEANING TO UVT 1224 |
| 1) <1b>[H | cursor to home |
| 2) <1b>[2J | erase to end of screen |
| 3) <1b>[4;25H | cursor to row 4, col 25 |
| 4) Account Management Menu | |
| 5) <1b>[7;10H | cursor to row 7, col 10 |
| 6) Add (A) Delete (D) Modify (M) List (L) End (E): | |
| 7) <1b>[7;60H | cursor to row 7, col 60 |
| 8) <1b>[7m | turn on highlight |
| 9) <1b>[0m | turn off highlight |
| 10) <1b>[9;40H | cursor to row 9, col 40 |
| 11) Account Number: | |
| 12) <1b>[9;60H | cursor to row 9, col 60 |
| 13) <1b>[7m | turn on highlight |
| 14) ——— | |
| 15) <1b>[0m | turn off highlight |
| 16) <1b>[7;60H | cursor to row 7, col 60 |

TABLE 2

(INPUT TO 3270)

| CHAR. SEQ. CS$_2$ | MEANING TO IBM 3270 |
|---|---|
| 1) SBA(0,0) | set buf ad to row 0, col 0 |
| 2) RA(0,0,0) | clear & protect entire screen |
| 3) SBA(3,24) | set buf ad to row 3, col 24 |
| 4) Account Management Menu | |
| 5) SBA(6,9) | set buf ad to row 6, col 9 |
| 6) Add (A) Delete (D) Modify (M) List (L) End (E) | |
| 7) SBA(6,59) | set buf ad to row 6, col 59 |
| 8) ——— | |
| 9) SBA(8,39) | set buf ad to row 8, col 39 |
| 10) Account Number: | |
| 11) SBA(8,59) | set buf ad to row 8, col 59 |
| 12) ——— | |
| 13) SBA(6,58)SF(C8) | start unprotect at R6, C58 |
| 14) SBA(6,60)SF(60) | stop unprotect at R6, C60 |
| 15) SBA(8,58)SF(C8) | start unprotect at R8, C58 |
| 16) SBA(8,67)SF(60) | stop unprotect at R8, C67 |
| 17) SBA(6,59)IC | insert cursor at R6, C59 |

TABLE 3

| KEYS HIT BY 3270 OPERATOR | MEANING TO 3270 |
|---|---|
| 1) A | |
| 2) <ENTER> | enter key |

TABLE 4

(OUTPUT FROM 3270)

| CHAR. SEQ. CS$_3$ | MEANING to 3270 |
|---|---|
| 1) aid=7d | enter key |
| 2) CA(6,61) | character attributes 6 & 61 |
| 3) SBA(6,59) | set buf ad to R6, C59 |
| 4) A | |

TABLE 5

(UNIX INPUT)

| CHAR. SEQ. CS$_4$ | MEANING to UVT 1224 |
|---|---|
| 1) A | |
| 2) <0d> | carriage return |

TABLE 6

(UNIX OUTPUT)

| CHAR. SEQ. CS$_1$ | MEANING TO UVT 1224 |
|---|---|
| 1) A | echo |
| 2) <1b>[9;60H | echo |
| 3) <1b>[H | cursor to home |
| 4) <1b>[2J | erase to end of screen |
| 5) <1b>[3;30H | cursor to row 3, col 30 |
| 6) Account File Managment | |
| 7) <1b>[6;10H | cursor to row 6, col 10 |
| 8) Account Nbr: | |
| 9) <1b>[6;40H | cursor to row 6, col 40 |
| 10) <1b>[7m | turn on highlight |
| 11) ——— | |
| 12) <1b>[0m | turn off highlight |
| 13) <1b>[7;10H | cursor to row 7, col 10 |
| 14) Balance: | |
| 15) <1b>[7;40H | cursor to row 7, col 40 |
| 16) <1b>[7m | turn on highlight |
| 17) ——— | |
| 18) <1b>[0m | turn off highlight |
| 19) <1b>[8;10H | cursor to row 8, col 10 |
| 20) Name: | |
| 21) <1b>[8;40H | cursor to row 8, col 40 |
| 22) <1b>[7m | turn on highlight |
| 23) ——— | |
| 24) <1b>[0m | turn off highlight |
| 25) <1b>[9;10H | cursor to row 9, col 10 |
| 26) Address: | |
| 27) <1b>[9;40H | cursor to row 9, col 40 |
| 28) <1b>[7m | turn on highlight |
| 29) ——— | |

TABLE 6-continued

(UNIX OUTPUT)

| CHAR. SEQ. CS$_1$ | MEANING TO UVT 1224 |
|---|---|
| 30) <1b>[0m | turn off highlight |
| 31) <1b>[10;10H | cursor to row 10 col 10 |
| 32) City State Zip: | |
| 33) <1b>[10;40H | cursor to row 10 col 40 |
| 34) <1b>[7m | turn on highlight |
| 35) ——— | |
| 36) <1b>[0m | turn off highlight |
| 37) <1b>[11;10H | cursor to row 11, col 10 |
| 38) Phone: | |
| 39) <1b>[11;40H | cursor to row 11, col 40 |
| 40) <1b>[7m | turn on highlight |
| 41) ——— | |
| 42) <1b>[0m | turn off highlight |
| 43) <1b>[13;20H | cursor to row 13, col 20 |
| 44) Exit | |
| 45) <1b>[13;40H | cursor to row 13, col 40 |
| 46) <1b>[7m | turn on highlight |
| 47) <1b>[0m | turn off highlight |
| 48) <1b>[6;40H | cursor to row 6, col 40 |

TABLE 7

(INPUT TO IBM 3270)

| CHAR. SEQ. CS$_2$ | MEANING TO IBM 3270 |
|---|---|
| 1) WRT(C3) | echo |
| 2) SBA(6,59) | echo |
| 3) A | echo |
| 4) SBA(0,0) | set buf ad to home position |
| 5) RA(0,0,0) | clear & protect entire screen |
| 6) SBA(2,29) | set buf ad to row 2, col 29 |
| 7) Account File Management: | |
| 8) SBA(5,9) | set buf ad to row 5, col 9 |
| 9) Account Nbr: | |
| 10) SBA(5,39) | set buf ad to row 5, col 39 |
| 11) ——— | |
| 12) SBA(6,9) | set buf ad to row 6, col 9 |
| 13) Balance | |
| 14) SBA(6,39) | set buf ad to row 6, col 39 |
| 15) ——— | |
| 16) SBA(7,9) | set buf ad to row 7, col 9 |
| 17) Name: | |
| 18) SBA(7,39 | set buf ad to row 7, col 39 |
| 19) ——— | |
| 20) SBA(8,9) | set buf ad to row 8, col 9 |
| 21) Address: | |
| 22) SBA(8,39) | set buf ad to row 8, col 39 |
| 23) ——— | |
| 24) SBA(9,9) | set buf ad to row 9, col 9 |
| 25) City State Zip: | |
| 26) SBA(9,39) | set buf ad to row 9, col 39 |
| 27) ——— | |
| 28) SBA(10,9) | set buf ad to row 10, col 9 |
| 29) Phone: | |
| 30) SBA(10,39) | set buf ad to row 10, col 39 |
| 31) ——— | |
| 32) SBA(12,19) | set buf ad to row 12, col 19 |
| 33) Exit: | |
| 34) SBA(12,39 | set buf ad to row 12, col 39 |
| 35) ——— | |
| 36) SBA(5,38)SF(C8) | start unprotect at R5, C38 |
| 37) SBA(5,47)SF(60) | stop unprotect at R5, C47 |
| 38) SBA(6,38)SF(C8) | start unprotect at R6, C38 |
| 39) SBA(6,47)SF(60) | stop unprotect at R6, C47 |
| 40) SBA(7,38)SF(C8) | start unprotect at R7, C38 |
| 41) SBA(7,64)SF(60) | stop unprotect at R7, C64 |
| 42) SBA(8,38)SF(C8) | start unprotect at R8, C38 |
| 43) SBA(8,64)SF(60) | stop unprotect at R8, C64 |
| 44) SBA(9,38)SF(C8) | start unprotect at R9, C38 |
| 45) SBA(9,64)SF(60) | stop unprotect at R9, C64 |
| 46) SBA(10,38)SF(C8) | start unprotect at R10, C38 |
| 47) SBA(10,49)SF(60) | stop unprotect at R10, C49 |
| 48) SBA(12,38)SF(C8) | start unprotect at R12, C38 |
| 49) SBA(12,40)SF(60) | stop unprotect at R12, C40 |
| 50) SBA(5,39)IC | insert cursor at R5, C39 |

TABLE 8

KEYS HIT BY 3270 OPERATOR

1) 111
2) <TAB>
3) 4444
4) <TAB>
5) <TAB>
6) 123 Main
7) <TAB>
8) <TAB>
9) 555-1212
10) <ENTER>

TABLE 9

(OUTPUT FROM IBM 3270)

| CHAR. SEQ. $CS_3$ | MEANING TO IBM 3270 |
|---|---|
| 1) aid = 7d | Enter key |
| 2) CA(12,39) | character attributes 12 & 39 |
| 3) SBA(5,39) | set buf ad to row 5, col 39 |
| 4) 111___ | Data in Field #1 + spaces |
| 5) SBA(6,39) | set buf ad to row 6, col 39 |
| 6) 4444___ | Data in Field #2 + spaces |
| 7) SBA(8,39) | set buf ad to row 8, col 39 |
| 8) 123 Main___ | Data in Field #4 + spaces |
| 9) SBA(10,39) | set buf ad to row 10, col 39 |
| 10) 555-1212___ | Data in Field #6 + spaces |

TABLE 10

(UNIX INPUT)

| CHAR. SEQ. $CS_4$ | MEANING TO UVT 1224 |
|---|---|
| 1) 111___ | Data in Field #1 + spaces |
| 2) 4444___ | Data in Field #2 + spaces |
| 3) <09> | Tab, Skip Data Field #3 |
| 4) 123 MAIN___ | Data in Field #4 + spaces |
| 5) <09> | Tab, Skip Data Field #5 |
| 6) 555-1212___ | Data in Field #6 + spaces |
| 7) <0d> | Carriage Return |

Beginning with Table 1, it has sixteen rows and two columns. In the left hand column, a series of characters is shown which is an example of the output character sequence $CS_1$ from the UNIX applications program 11a. All of the characters in the sequence $CS_1$ are sent one after the other as a continuous stream of characters to the input port $IP_1$ of the block mode-character mode converter program 11b.

Each of the characters in the sequence $CS_1$ of Table 1 has a certain meaning to the character mode terminal 12; and, that meaning is stated in the right hand column of Table 1. For example, when the characters in the first row of Table 1 are sent to the terminal 12, that terminal will generate a cursor on the screen $S_1$ at a "home" position, which is row 1, column 1 on the screen. Likewise, when the characters in the second row of Table 1 are sent to the terminal 12, that terminal will respond by erasing all characters from the screen $S_1$.

Next, with the characters of rows three thru fifteen of Table 1, a visual display is generated on the screen $S_1$; and that display is shown in FIG. 2. For example, by the characters of rows three and four in Table 1, the words "Account Management Menu" are written on the screen $S_1$ beginning at row 4, column 25. Similarly, by the characters of rows five and six in Table 1, the words "Add (A) . . . End (E):" are written on the screen $S_1$ beginning at row 7, column 10.

Thereafter, at row sixteen of Table 1, the cursor is positioned to row 7, column 60 of the screen $S_1$. That cursor position corresponds to a cursor position which was previously addressed in row seven of Table 1. Such a movement of the cursor to a previously addressed cursor position is interpreted by the converter program 11b as the end of the character sequence $CS_1$.

To an operator of the character mode terminal 12, the FIG. 2 display on the screen $S_1$ is interpreted as a form which prompts the operator on how to respond via the keyboard $K_1$. Of particular importance in the FIG. 2 display are two highlighted regions, which begin at row 7 column 60 and row 9 column 60, and are there shown as cross hatching. Each highlighted region implies a field in which the operator of terminal 11 should enter data. In Table 1, the highlighting is generated by the characters which occur at rows seven-nine and twelve-fourteen.

In response to the character sequence $CS_1$ of Table 1, the converter program 11b generates on its output port $OP_1$, the character sequence $CS_2$ of Table 2. That character sequence $CS_2$, when sent through the units 13-17 to the character mode terminal 18, produces the visual display of FIG. 3 which mimics the visual display of FIG. 2.

Table 2 has seventeen rows and two columns. In the left hand column, the characters which make up the character sequence $CS_2$ are shown; and in the right hand column, the meaning of those characters to the terminal 18 is stated.

By the characters in the first two rows of Table 2, the entire screen $S_2$ in the terminal 18 is cleared and protected from any alteration by an operator of that terminal. If the operator of terminal 18 tries to write data via the keyboard $K_2$ into any region of the screen that is protected, the write will not occur and the keyboard will lock up.

Thereafter, by the characters in rows 3-12 of Table 2, all of the words which occur in the FIG. 2 display are repeated at similar locations in the FIG. 3 display. For example, by the characters of rows three and four of Table 2, the words "Account Management Menu" are written on the screen $S_2$ beginning at row 3 column 24.

Next, by the characters of rows 13-16 of Table 2, two unprotected regions are defined on the screen $S_2$ of terminal 18 which correspond to the two regions that were highlighted on the screen $S_1$ in terminal 12. These unprotected regions of the screen $S_2$ begin at rows 6 and 8 of column 59.

To unprotect the field on the screen $S_2$, a control code of C8 is stored immediately before the start of that field; and, a control code of 60 is stored immediately after that field. These control codes are not visible to the operator of the terminal 18; and to indicate this in FIG. 3, the control codes of C8 and 60 are surrounded by dashed lines.

Each unprotected region on the screen $S_2$ represents a data input field for the operator of the terminal 18; and, all of the data entry fields are indicated to the operator by the underlining which is generated by the Table 2 characters of rows 7, 8, 11, and 12. Also, by the characters of row 17 of Table 2, a cursor is positioned on the screen $S_2$ to the start of the first data entry field.

One feature of the above described character sequence $CS_2$ is that the total number of characters in the sequence is substantially smaller than the total number of characters which fit on the screen $S_2$. In the IBM 3270 terminal, the screen $S_1$ is twenty-four rows by eighty columns which is a total of 1,920 characters; whereas, the character sequence $CS_2$ of Table 2 contains less than one-hundred characters. Consequently, the transmission time on the networks 13 and 17 is reduced by a factor of over 19:1 in comparison to the transmission time for a full screen.

Another feature of the character sequence $CS_2$ is that by protecting the entire screen $S_2$ except for certain fields, the screen data which is sent from terminal 18 as a response sequence $CS_3$ will only include data in those unprotected fields. Details of such a response character sequence will be described shortly in conjunction with Tables 4 and 9. If, by comparison, the entire screen $S_2$ is left unprotected, then the response character sequence $CS_3$ will contain the entire screen $S_2$; that in turn will again increase the transmission time on the networks 13 and 17 by a large factor.

Still another feature of the character sequence $CS_2$ is that all of the control characters C8 and 60 which define the unprotected fields are located at the end of the character sequence. This is important because each such control character occupies a certain row-column position on the screen $S_2$ as is shown in FIG. 3; and by locating those control characters at the end of the character sequence $CS_2$, they will overwrite any other data characters which may by chance happen to be located at the same location on the screen $S_2$.

Next, in response to the FIG. 3 display on the screen $S_2$, an operator of the terminal 18 enters certain data into one or more of the data entry fields by means of the keyboard $K_2$. An example of this data entry step is shown by Table 3 and FIG. 4. In this example, the operator of the terminal 18 first writes an "A" into the data entry field at row 6 column 59; and then, the operator presses the "ENTER" key. By writing the "A" into the data entry field, the operator tells the UNIX applications program 11a that he wishes to "add" a new account to the program. Then, by pressing the ENTER key, the operator causes the terminal 18 to send the content of all data in an unprotected field through the units 17-13 to the UNIX applications program 11a.

Table 4, in its left-hand column, shows the character sequence $CS_3$ which is sent in response to the above data entry step of Table 3. Starting the character sequence $CS_3$ are the characters of row 1 which identify the ENTER key. That is followed by the characters of row 2 which define various attributes, such as font type, of the character sequence. Then, the characters of rows 3 and 4 identify the "A" key as being written by the operator at row 6 column 59 in the FIG. 4 display.

Of primary importance in the Table 4 character sequence is the fact that just a very small fraction of the entire screen $S_2$ is sent. In particular, in the character sequence $CS_3$, the only character from the screen $S_2$ is the "A" which was entered by the operator into the unprotected data entry fields. As a result, data transmission time over the networks 17 and 13 is reduced by a factor of over 1900:1 in comparison to the transmission time for a full screen.

Upon receiving the character sequence $CS_3$ on its input port $IP_2$, the block mode-character mode converter program 11b converts that sequence to the character sequence $CS_4$ as shown in Table 5. In the Table 5 sequence, data written into the data entry fields is repeated; but the remaining characters, which are control characters, are completely changed. In particular, the ENTER key is stripped from the sequence since it is a block mode terminal control character which has no meaning to UNIX applications program 11a. Also, in the Table 5 sequence, a CARRIAGE RETURN character is inserted at the end of the sequence to mimic a key which an operator of the character mode terminal 12 would press to signal the end of his data entry.

When the UNIX application program receives the character sequence $CS_4$ of Table 5, the program internally processes that character sequence; and in response, it generates another UNIX output character sequence $CS_1$. An example of that character sequence is shown in the left-hand column of Table 6. When the Table 6 character sequence is sent to the character mode terminal 12, it will generate a new video display on the screen $S_1$ which is illustrated in FIG. 5.

Inspection of FIG. 5 shows that the display constitutes another form which has several data entry fields. Each data entry field is again implied by highlighting which in FIG. 5 begins at column 40 of rows 6-11 and 13. That highlighting is generated in response to the control characters which occur in the character sequence $CS_1$ of Table 6 at lines 9-12, 15-18, 21-24, 27-30, 33-36, 39-33, and 45-47.

Character sequence $CS_1$ is received by the converter program 11b on its input port $IP_1$; and in response, the converter program 11b generates the character sequence $CS_2$ of Table 7 on its output port $OP_1$. Here again, the Table 7 character sequence is generated such that it will produce a visual display on the screen $S_2$ of terminal 18 which mimics the FIG. 5 display in terminal 12. That screen $S_2$ display is shown in FIG. 6.

To generate the FIG. 6 display, the Table 7 characters of rows 4 and 5 clear and protect the entire screen $S_2$. Next the Table 7 characters of rows 6-35 write text on the screen $S_2$ which corresponds to the text on the screen $S_1$. Then, the Table 7 characters of rows 36-49 unprotect various regions of the FIG. 6 display which correspond to those regions of the FIG. 5 display which were highlighted. Here again, these unprotected regions of the FIG. 6 display create data entry fields for the operator of terminal 18.

In response to the FIG. 6 display, the operator of terminal 18 utilizes the keyboard $K_2$ to write into some of the data entry fields. Table 8 shows an example of the keys which are pressed by the terminal 18 operator during this data entry step; and, FIG. 7 shows the corresponding display which occurs on the screen $S_2$.

Inspection of Table 8 and FIG. 7 shows that some data entry fields are only partially filled by the terminal 18 operator. This occurs, for example, when the operator enters an account number via the keys in rows one and two of Table 8. There, the pushing of a tab key in row two causes the cursor to move on screen $S_2$ from the data entry field labeled "Account Number" to the left most location in the next data entry field which is labeled "Balance".

Also, inspection of Table 8 and FIG. 7 shows that some of the data entry fields may be left completely blank by the terminal 18 operator. Such blanks occur in the FIG. 7 display for the data entry fields which are labeled "Name" and "City, State, Zip". These blank fields are caused by the TAB key in Table 8 at lines 5 and 8.

When the terminal 18 operator pushes the ENTER key at line 10 of Table 8, the character sequence $CS_3$ of Table 9 is sent through the units 17-13 to the input port $IP_2$ of the converter program 11b. In the Table 9 character sequence, any data entry field which is partially filled is sent in its entirety and space characters are sent to fill the field. This is shown by rows 4, 6, 8, and 10 of Table 9.

By comparison, if a data entry field is left completely empty by the terminal 18 operator, then in the character sequence of Table 9, no characters represent that empty field. For example, in the Table 9 character sequence, no characters indicate that the data entry fields which are labeled "Name" and "City, State, Zip" even exist.

Upon receiving the Table 9 character sequence, the converter program 11b generates on its output port OP$_2$, the character sequence CS$_4$ of Table 10; and, that character sequence is then sent to the UNIX applications program 11a. Character sequence CS$_4$ of Table 10 includes all of the data characters from the data entry fields which occur in the Table 9 character sequence CS$_3$. However, those data characters in the Table 10 sequence are interspaced by various control characters which are totally different than the control characters in the Table 9 character sequence. For example, the ENTER control character is stripped from the beginning of the Table 10 sequence, and the CARRIAGE RETURN control character is added to the end of that sequence.

Also in the Table 10 character sequence, extra TAB control characters are interspaced between the data characters wherever a data entry field is left empty. These TAB characters occur in Table 10 at rows 3 and 5; and, they are needed to mimic the action which an operator of the terminal 12 would take in order to skip over the empty fields.

In order to determine where the above TAB characters need to be inserted, the converter program 11b internally stores the location of all of the data entry fields which it previously created on the terminal 18 screen S$_2$ by the character sequence CS$_2$ of Table 7. Then, when the converter program 11b receives the Table 9 character sequence, the stored locations of the data entry fields are compared with the locations of the data in the Table 9 character sequence. If the Table 9 character sequence contains no data in a particular data entry field, then a TAB control character is inserted in the UNIX input character sequence CS$_4$ such that the empty field is skipped.

Note that in order to make the above description easier to follow, some of the entries in the Tables 1–9 are acronyms for a particular character which indicate the characters meaning. Now, for completeness, Table 11 below identifies each acronym and gives their actual hexidecimal bit representation.

TABLE 11

| Acronym | Hexidecimal | Acronym | Hexidecimal |
|---|---|---|---|
| <1b> | 1b | aid=7d | 7d |
| SBA ( ) | 11 | CA ( ) | c0 |
| RA ( ) | 3c | <0d> | 0d |
| SF ( ) | 1d | WRT ( ) | 31 |
| <ENTER> | 7d | <09> | 09 |
|  |  | <TAB> | 09 |

A preferred embodiment of the invention has now been described in detail. In addition, however, many changes and modifications can be made to the above described embodiment without departing from the nature and spirit of the invention.

For example, the converter program 11b can be modified to examine the UNIX output character sequence CS$_1$ for various visual attributes other than highlighting in order to determine which regions of the screen S$_2$ should be unprotected. In particular, program 11b can be modified to create unprotected data entry fields wherever the character sequence CS$_1$ calls for any combination of the following visual attributes: highlighting, blinking, bold print, and underlining.

As another example, the converter program 11b can be modified to generate its output character sequence CS$_2$ such that it will produce a visual display on any selected block mode terminal instead of the IBM 3270 block mode terminal. In that case, the converter program 11b would likewise be modified to receive a control sequence CS$_3$ on its input port IP$_2$ from the selected character mode terminal and to convert that sequence to the described character sequence CS$_4$ on its output terminal OP$_2$.

Accordingly, it is to be understood that the invention is not limited to the above described preferred embodiment but is defined by the appended claims.

What is claimed is:

1. For use in an emulator, a method of enabling a UNIX program to operate with a block mode terminal when said UNIX program is designed to operate with a character mode terminal; said method including the steps of:

receiving from said UNIX program, a UNIX output sequence of characters which produces a display on a video screen in said character mode terminal;

identifying in said UNIX output sequence of characters, first type control characters that define a predetermined visual attribute at various regions within said display in said character mode terminal;

generating, after said identifying step, an input sequence of characters for said block mode terminal, which differs from said UNIX output sequence of characters, and which produces an emulated display on a video screen within said block mode terminal that mimics said display in said character mode terminal; and, including in said input sequence of characters, in response to said identifying step, second type control characters which—a) protect all of said emulated display from operator alteration except for certain fields that correspond to said regions in said character mode terminal display with said predetermined visual attribute, and b) prevent said block mode terminal from transmitting, to said emulator, a response character sequence with characters from any protected portion of said emulated display.

2. A method according to claim 1 wherein said predetermined visual attribute is highlighting.

3. A method according to claim 1 wherein said predetermined visual attribute is blinking.

4. A method according to claim 1 wherein said predetermined visual attribute is bold print.

5. A method according to claim 1 wherein said predetermined visual attribute is underlining.

6. A method according to claim 1 and further including the step of:

positioning said second type control characters at the end of said input sequence of characters such that they override any preceding characters which, in said emulated display, occupy the same location as any of said second type control characters.

7. A method according to claim 1 and further including the steps of:

sensing, in said UNIX output sequence of characters, third type control characters which position a cursor to one of said regions with said predetermined visual attribute; and, in response thereto, sending said input sequence of characters to said block mode terminal.

8. A method according to claim 1 and further including the step of:

receiving, from said block mode terminal, a response character sequence which includes data characters written by an operator into at least some of said unprotected fields of said emulated display and no characters from the protected remainder of said emulated display.

9. A method according to claim 8 wherein said unprotected fields of said emulated display occupy less than 50% of the entire emulated display.

10. A method according to claim 8 wherein said sending of said input sequence of characters to said block mode terminal and said receiving of said response character sequence from said block mode terminal occur over a time-shared data communications channel.

11. A method according to claim 8 and further including the steps of:

examining said response character sequence for fields, as defined by said second type control characters, which are empty; and, generating a UNIX input character sequence from said terminal response character sequence in which said data characters are repeated and in which for each empty field, a third control character is included that identifies a key in said character mode terminal by which a cursor is moved.

12. A method according to claim 11 wherein said third type control character identifies a TAB key.

13. A method according to claim 11 wherein said third type control character identifies a SPACE key.

14. A method according to claim 11 and further including the step of appending, at the end of said UNIX input character sequence, a fourth type control character which identifies a CARRIAGE RETURN key on said character mode terminal.

15. A method according to claim 11 and further including the steps of:

recognizing, in said response character sequence, a fifth type control character which identifies a key in said block mode terminal that caused said terminal response character sequence to be sent; and, excluding said fifth type control character from said UNIX input character sequence.

16. A method according to claim 15 wherein said fifth type control character identifies an ENTER key.

* * * * *